United States Patent
Ichikawa (10) Patent No.: US 8,538,336 B2
(45) Date of Patent: Sep. 17, 2013

(54) RADIO LSI DEVICE AND INTERFERING WAVE DETECTING CIRCUIT

(75) Inventor: Takeshi Ichikawa, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 389 days.

(21) Appl. No.: 12/619,705

(22) Filed: Nov. 17, 2009

(65) Prior Publication Data

US 2010/0123835 A1    May 20, 2010

(30) Foreign Application Priority Data

Nov. 19, 2008 (JP) ................................. 2008-295438

(51) Int. Cl.
*H04B 1/00* (2006.01)
*H04B 1/38* (2006.01)
*H03K 9/00* (2006.01)

(52) U.S. Cl.
USPC ........................... 455/63.1; 375/316; 375/219

(58) Field of Classification Search
USPC .................... 455/63.1, 73, 63, 206, 295, 303, 455/305, 179.1, 556.1, 557, 635; 375/219, 375/150, 316
See application file for complete search history.

(56) References Cited

U.S. PATENT DOCUMENTS

| | | | | |
|---|---|---|---|---|
| 4,635,298 A * | 1/1987 | Kage et al. | ..................... | 455/295 |
| 5,444,862 A * | 8/1995 | Hibino | .......................... | 455/504 |
| 6,064,678 A * | 5/2000 | Sindhushayana et al. | .... | 370/470 |
| 6,891,496 B2 * | 5/2005 | Husted et al. | ................... | 342/57 |
| 6,909,879 B1 * | 6/2005 | Centore, III | ................. | 455/63.1 |
| 7,792,180 B2 * | 9/2010 | Ichikawa | ....................... | 375/219 |
| 7,929,508 B1 * | 4/2011 | Yucek et al. | ................... | 370/338 |
| 7,970,065 B2 * | 6/2011 | Horiguchi et al. | ............ | 375/260 |
| 7,978,106 B1 * | 7/2011 | Wu et al. | ........................ | 341/139 |
| 2002/0021373 A1 * | 2/2002 | Shibamiya | ..................... | 348/734 |
| 2002/0090203 A1 * | 7/2002 | Mankovitz | ...................... | 386/83 |
| 2006/0209721 A1 * | 9/2006 | Mese et al. | ..................... | 370/254 |
| 2007/0133994 A1 * | 6/2007 | Chi | ................................ | 398/115 |
| 2009/0077600 A1 * | 3/2009 | Lin et al. | ......................... | 725/99 |
| 2010/0110913 A1 * | 5/2010 | Min et al. | ....................... | 370/252 |

FOREIGN PATENT DOCUMENTS

| | | |
|---|---|---|
| JP | 08-079203 | 3/1996 |
| JP | 2000-069565 | 3/2000 |
| JP | 2008-072646 | 3/2008 |

OTHER PUBLICATIONS

Japanese Office Action dated Oct. 9, 2012.

* cited by examiner

Primary Examiner — Andrew Wendell
Assistant Examiner — Cindy Trandai
(74) *Attorney, Agent, or Firm* — Volentine & Whitt, PLLC (57) ABSTRACT

A radio LSI device includes an interfering wave detecting circuit that receives an RSSI signal for a current transmit/receive channel. The interfering wave detecting circuit includes a field intensity determiner that determines whether or not the value of the RSSI signal is greater than a predetermined threshold value. The interfering wave detecting circuit also includes a duration counter that counts the duration of an interfering wave whose RSSI value is greater than the predetermined threshold value. The interfering wave detecting circuit also includes a duration comparator that, if the duration exceeds a duration comparative value, generates an interrupt signal. The radio LSI device changes the setting of the current transmit/receive channel in response to the interrupt signal.

12 Claims, 11 Drawing Sheets

FIG. 10A CONVENTIONAL REMOTE CONTROLLER OPERATION WHEN INTERFERING WAVE EXISTS CONSUMPTION CURRENT

FIG. 10B REMOTE CONTROLLER OPERATION WHEN INTERFERING WAVE EXISTS IN THIS EMBODIMENT

RADIO LSI DEVICE AND INTERFERING WAVE DETECTING CIRCUIT

BACKGROUND OF THE INVENTION

1. Field of the Invention

The present invention relates to a radio LSI device which selects one channel from a plurality of radio channels to perform radio communication and particularly to a radio LSI device which performs channel selection according to the detection of an interfering wave. The present invention also relates to an interfering wave detecting circuit for detecting the interfering wave.

2. Description of the Related Art

Figure 1:
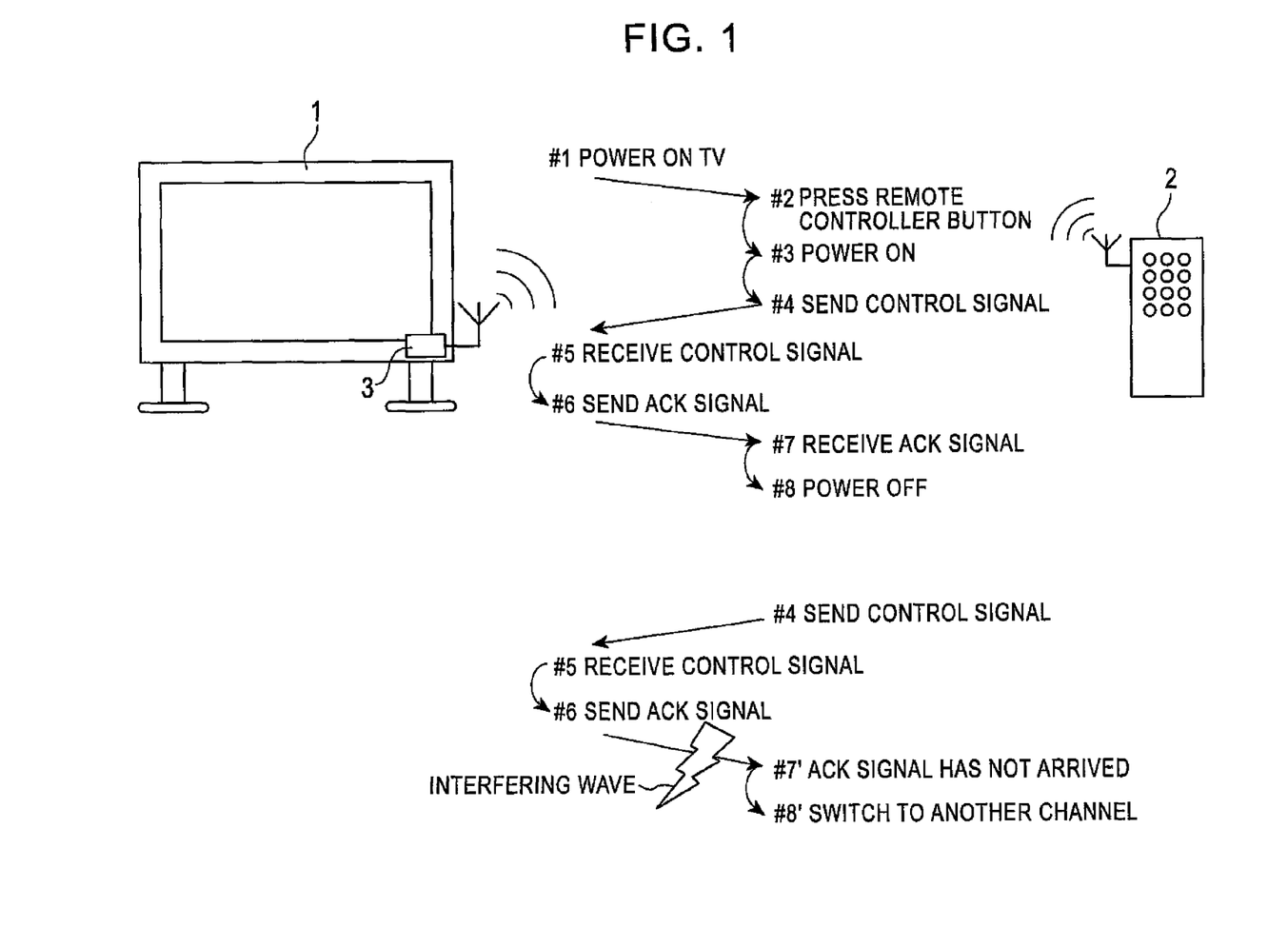
FIG. 1 illustrates how signals are usually exchanged between a television set and its remote controller.

FIG. 1 of the accompanying drawings shows an ordinary way of exchanging signals between a television set 1 and a remote controller 2 associated with the television set 1. The television set or TV set 1 is an apparatus that reproduces usual terrestrial or satellite, analog or digital broadcasting and has a remote control transceiver 3. The remote control transceiver 3 has specifications that conform to the remote controller 2. The remote control transceiver 3 performs the switching of broadcast channels and/or the volume adjustment of the TV set 1 according to the content of a control signal supplied from the remote controller 2. The remote controller 2 has a radio LSI device that selects one of a plurality of radio channels to perform radio communication. The remote controller 2 generates and transmits a control signal, according to a remote control button operation made by an operator, to the TV set 1 via the selected channel.

The procedure of exchanging signals in FIG. 1 will be described. First, in response to the turning on of the TV set 1, the remote control transceiver 3 is activated, and the TV set 1 waits until a control signal arrives. Meanwhile, the remote controller 2 is activated in response to the power button being pressed. The remote controller 2 executes channel selection (CCA: Clear Channel Assessment) and determines the presence/absence of a radio wave on the selected channel. If a radio wave is present on the channel, the remote controller 2 performs channel selection again a certain time (i.e., delay time) later. The delay time is decided by random numbers or the like. This operation is repeated until the channel becomes vacant. When a radio wave is not present on the channel, the remote controller 2 transmits a control signal corresponding to the operator's remote control button operation over the selected channel and waits.

Upon receiving a control signal from the remote controller 2, the TV set 1 transmits an Ack (acknowledgement) signal acknowledging successful signal reception. The TV set 1 performs an operation (such as volume adjustment) according to the control signal and waits for the next control signal. Meanwhile, when having received the Ack signal from the TV set 1, the remote controller 2 finishes this remote control operation.

The lower part of FIG. 1 depicts a case where an interfering wave is present. If an interfering wave is present when the remote controller 2 transmits a control signal, the TV set 1 will not transmit an Ack signal in response to this control signal, or even if the TV set 1 transmits the Ack signal, the Ack signal does not reach the remote controller 2. If an Ack signal does not arrive at the remote controller 2 even after a predetermined time has passed, the remote controller 2 gives up transmitting the control signal over this channel and performs channel selection again to switch to another channel. Such phenomenon causes an operating delay of the remote controller 2 and also an increase in power consumption of the battery incorporated in the remote controller 2.

Japanese Patent Application Kokai (Laid-Open) No. 2000-069565 discloses a technique for avoiding a reduction in throughput due to the switching of radio channels. Paragraph 0023 and FIG. 2 of Japanese Patent Application Kokai No. 2000-069565 describe that if it is determined that the result of a first radio channel electric field intensity measurement and the result of a second radio channel electric field intensity measurement after a predetermined time (a set count time) has passed from the first measurement both exceed a reference value, then the switching of radio channels is performed.

SUMMARY OF THE INVENTION

In the conventional art such as Japanese Patent Application Kokai No. 2000-069565, the measurement of electric field intensity (RSSI: Received Signal Strength Indication) is performed only at two particular timings. As long as the radio channel electric field intensity exceeds a reference value at those timings, it is determined that an interfering wave is present, and the selected radio channel is switched to another channel (see FIG. 2 of the accompanying drawings). That is, a radio channel which is not really subject to interference may be determined to be "subject to interference," and thus unnecessary radio channel switching may be effected. This unnecessary channel switching causes a reduction in throughput and also an increase in power consumption. In particular, for the remote controller that is powered by a battery, the battery lifetime is remarkably shortened by the unnecessary channel switching.

An object of the present invention is to provide a radio LSI device that can more reliably (or precisely) determine whether there is really an adversely affecting wave (really "interfering" wave) is present on a radio channel.

Another object of the present invention is to provide an interfering wave detecting circuit that can more reliably determine whether there is a really "interfering" wave is present on a radio channel.

According to a first aspect of the present invention, there is provided a radio LSI device that includes an RF transceiver unit having a plurality of radio channels. The radio LSI device also includes an RF control unit for selecting one of the radio channels to set the selected channel as a current transmit/receive channel of the RF transceiver unit. The radio LSI device also includes an interfering wave detecting circuit that takes in an RSSI signal for the current transmit/receive channel from the RF transceiver unit. The interfering wave detecting circuit has a field intensity determiner that determines whether or not the value of the RSSI signal is greater than a predetermined threshold value. The interfering wave detecting circuit also has a duration counter that counts the duration of an interfering wave whose RSSI value is greater than the predetermined threshold value. The interfering wave detecting circuit has a duration comparator that compares the duration of the interfering wave counted by the duration counter with a predetermined duration comparative value. If the duration of the interfering wave exceeds the duration comparative value, the duration comparator generates an interrupt signal. The RF control unit changes the setting of the current transmit/receive channel in response to the interrupt signal.

The radio LSI device can detect, in a more reliable manner, a state where a really adverse interfering wave is present on a radio channel. By only detecting and dealing with the really interfering wave, it is possible to avoid unnecessary channel switching, and therefore it is possible to avoid unnecessary increases in operating delay and power consumption.

According to another aspect of the present invention, there is provided an interfering wave detecting circuit that detects the presence/absence of an interfering wave according to the value of an RSSI signal. The detecting circuit includes a field intensity determiner that determines whether or not the value of the RSSI signal is greater than a predetermined threshold value. The detecting circuit also includes a duration counter that counts the duration of an interfering wave whose RSSI value is greater than the predetermined threshold value. The detecting circuit also includes a duration comparator that compares the duration of the interfering wave counted by the duration counter with a predetermined duration comparative value. If the duration of the interfering wave exceeds the duration comparative value, the duration comparator generates an interrupt signal indicating the presence of the interfering wave.

The interfering wave detecting circuit can determine, in a more reliable manner, a state where a really adverse interfering wave is present on a radio channel. By only detecting and dealing with the really adverse wave, it is possible to avoid unnecessary channel switching and therefore it is possible to avoid unnecessary increases in operating delay and power consumption.

These and other objects, aspects and advantages of the present invention will become apparent to those skilled in the art from the following detailed description when read and understood in conjunction with the appended claims and drawings.

DETAILED DESCRIPTION OF THE INVENTION

Embodiments of the present invention will be described in detail below with reference to the accompanying drawings.

Figure 3:
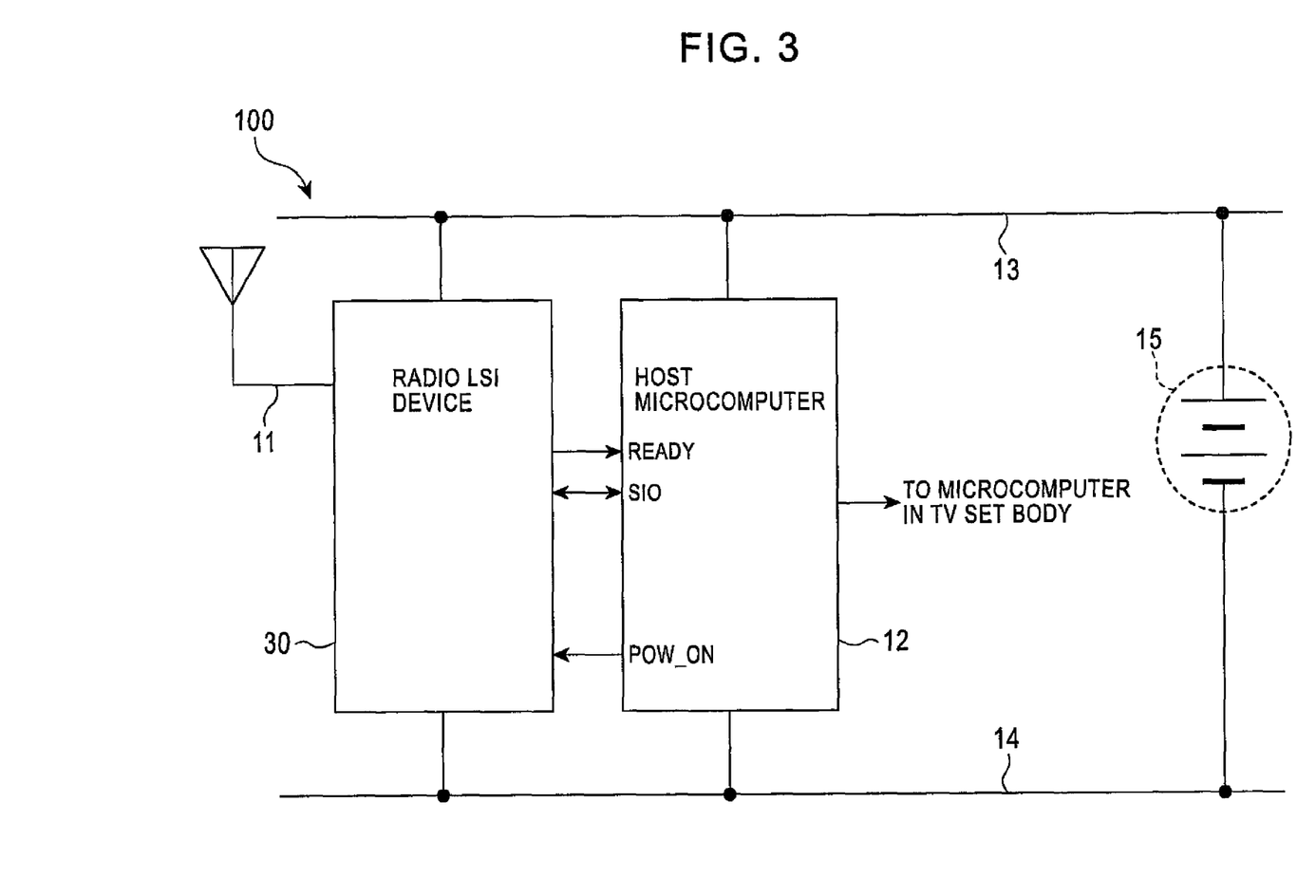
FIG. 3 is a block diagram of a TV set according to one embodiment of the present invention.

Referring to FIG. 3, a configuration of a TV set 100 used with a remote controller (FIG. 4) is described. The TV set 100 has a radio LSI device 30 and a host microcomputer 12 to which operating power is supplied via power lines 13, 14 from a power supply 15. The TV set 100 also has a usual TV broadcast receiving-reproducing function. The radio LSI device 30 transmits/receives data signals (i.e., control signals) to/from the remote controller (FIG. 4) via a radio antenna 11. The host microcomputer 12, in response to a ready signal (READY) from the radio LSI device 30, receives/sends a control signal (SIO) from/to the radio LSI device 30 and supplies a control signal to switch broadcast channels and/or adjust the volume according to the content of that control signal to a microcomputer in the main body (not shown) of the TV set 100. The host microcomputer 12 supplies a power supply control signal (POW_ON) to the radio LSI device 30 to activate the radio LSI device 30 itself.

Figure 4:
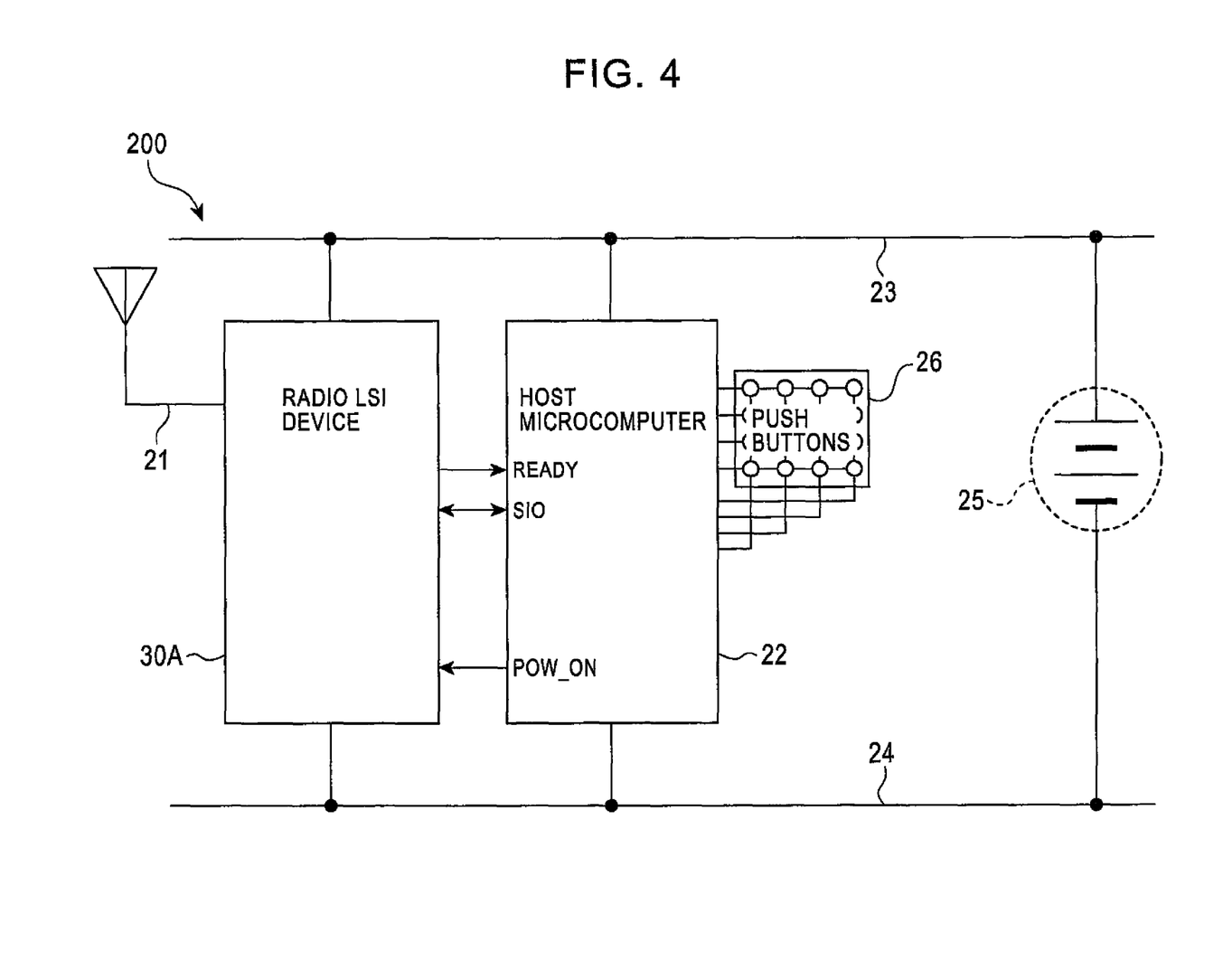
FIG. 4 is a block diagram of a remote controller according to the embodiment of the present invention, which is used with the TV set shown in FIG. 3.

FIG. 4 shows the configuration of the remote controller 200 for use with the TV set 100 (FIG. 3). The remote controller 200 has a function to remotely control the TV set 100 according to an button pressing operation by an operator. The remote controller 200 has a radio LSI device 30A and a host microcomputer 22 to which operating power is supplied via power lines 23, 24 from a power supply 25. The radio LSI device 30A transmits/receives data signals (i.e., control signals) to/from the TV set 100 (FIG. 3) via a radio antenna 21. The host microcomputer 22, in response to a ready signal (READY) from the radio LSI device 30A, receives/sends a control signal (SIO) from/to the radio LSI device 30A. The host microcomputer 22 detects which one among a plurality of buttons provided in a key scan unit 26 is pressed, and supplies a control signal corresponding to the pressed button to the radio LSI device 30A. The host microcomputer 22 sends a power supply control signal (POW_ON) to the radio LSI device 30A to start the radio LSI device 30A itself.

Figure 5:
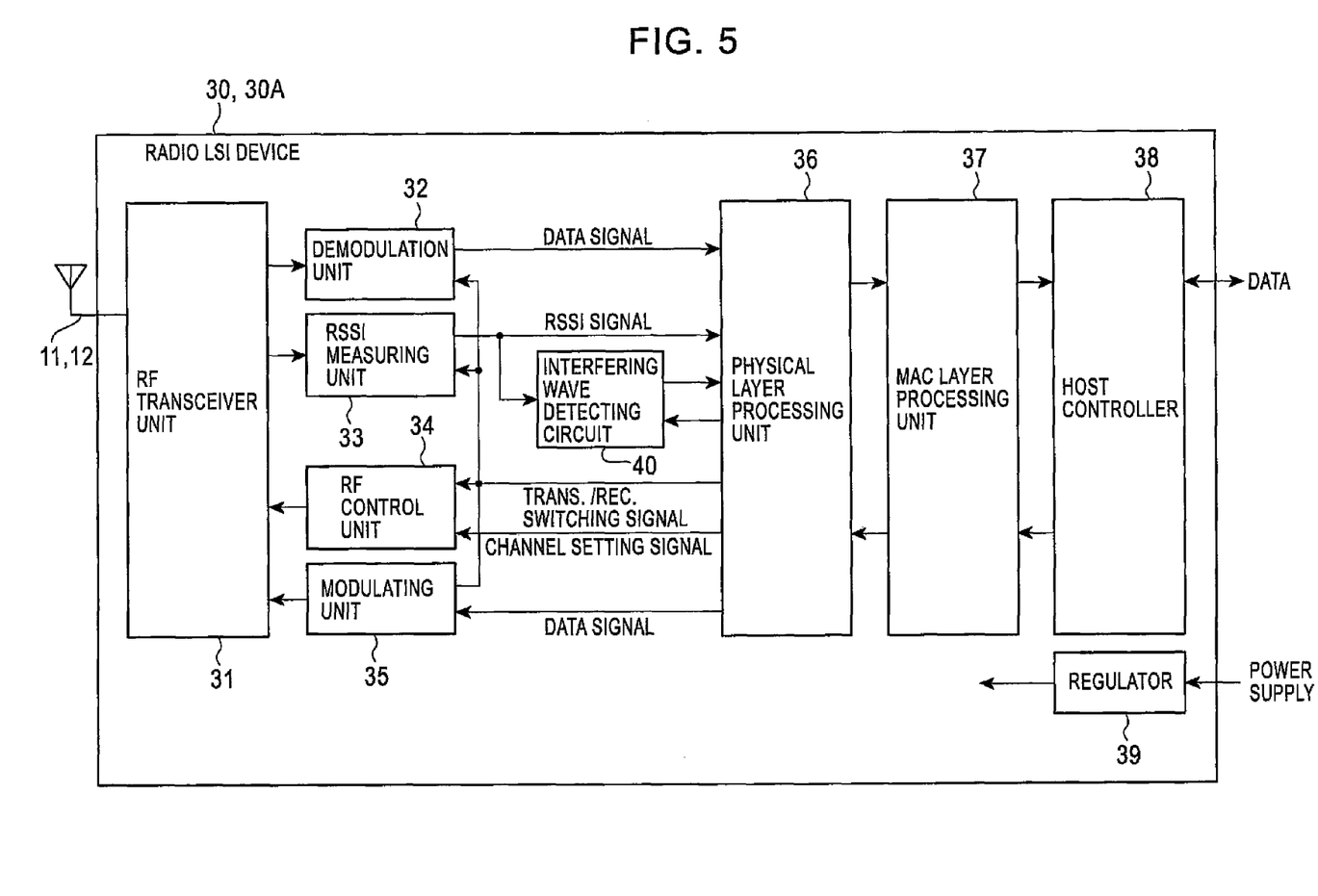
FIG. 5 is a block diagram showing the internal configuration of a radio LSI device shown in FIGS. 3 and 4.

FIG. 5 shows the internal configuration of the radio LSI device 30, 30A shown in FIGS. 3 and 4. The radio LSI device 30 has the same configuration as the radio LSI device 30A. In the following description, therefore, the radio LSI device 30 will only be explained. The radio LSI device 30 is a device which selects one of a plurality of radio channels to perform radio communication over the selected channel and may be embodied (implemented) as one large-scale integrated semiconductor chip. The radio LSI device 30 has an RF transceiver unit 31, a demodulating unit 32, an RSSI measuring unit 33, an RF control unit 34, a modulating unit 35, an interfering wave detecting circuit 40, a physical layer processing unit 36, a MAC layer processing unit 37, a host controller 38, and a regulator 39.

The RF transceiver unit 31 transmits and receives radio signals according to a radio communication standard such as ZigBee via the radio antenna 11. The RF transceiver unit 31 supplies the radio signal received via the radio antenna 11 to the demodulating unit 32, and transmits a radio signal supplied from the modulating unit 35 to the TV set 100 (FIG. 3). The RF transceiver unit 31 uses a channel as a current transmit/receive channel under the control of the RF control unit 34. When the ZigBee standard is used as the radio communication standard for use in the RF transceiver unit 31, the standard of IEEE 802.15.4 is applied to the physical layer interface, and the same frequency band of 2.4 GHz as for the radio LAN standard of IEEE 802.11b can be used. The frequency band is divided into 16 channels. In such application, the data transfer rate is a maximum of 250 kbps, the transmission distance is a maximum of 30 m, and a maximum of 64,000 apparatuses can be connected to one network.

The demodulating unit 32 demodulates a radio signal, which has been modulated using a modulation scheme such as OQPSK (Offset Quadrature Phase Shift Keying), to reproduce a data signal. The modulating unit 35 modulates a data signal to a radio signal. The RSSI measuring unit 33 measures the electric field intensity of a radio signal on the transmit/receive channel currently set in the RF transceiver unit 31, generates an RSSI (Received Signal Strength Indication) signal indicating the electric field intensity, and supplies the RSSI signal to the interfering wave detecting circuit 40.

The RF control unit 34 controls the transmit/receive operation (RX_ON, TX_ON, etc.) of the RF transceiver unit 31 according to a transmission/reception switching signal supplied from the physical layer processing unit 36. The RF control unit 34 selects one channel from a plurality of channels as the current transmit/receive channel of the RF transceiver unit 31 according to a channel setting signal supplied from the physical layer processing unit 36. The interfering wave detecting circuit 40 receives a radio signal on the current transmit/receive channel supplied from the RF transceiver unit 31, and detects an interfering wave from the radio signal. If the interfering wave detection circuit 40 detects the interfering wave, the detection circuit 40 supplies an interrupt signal to the physical layer processing unit 36. The interfering wave detecting circuit 40 takes in values such as a field intensity threshold value from the physical layer processing unit 36.

The physical layer processing unit 36 performs the processing of the physical layer of the OSI Reference Model. The physical layer processing unit 36 receives a data signal from the demodulating unit 32 while supplying a data signal to the modulating unit 35. Further, the physical layer processing unit 36 sets the field intensity threshold value and a duration comparative value in the interfering wave detecting circuit 40 and takes in an interrupt signal urging channel-switching from the interfering wave detecting circuit 40. The physical layer processing unit 36 supplies the channel setting signal to the RF control unit 34 in response to this interrupt signal.

The MAC layer processing unit 37 performs the processing of the data link layer of the OSI Reference Model for the network and performs access control such as frame arrangement determination and CSMA/CA for radio signals to relay data signals to/from the host controller 38. The host controller 38 supplies a ready signal to the host side (i.e., a circuit such as an external microcomputer) to perform data input/output. Further, the host controller 38 supplies the externally given field intensity threshold value and duration comparative value to the physical layer processing unit 36 via the MAC layer processing unit 37. The regulator 39 stably supplies operating power to each of the above-mentioned units.

In this embodiment, it has been described that radio signals that the radio LSI device 30 transmits/receives are radio signals according to the ZigBee standard, but the present invention is not limited in this regard. For example, the radio signals that the radio LSI device 30 transmits/receives may be light signals such as infrared light or acoustic signals such as audible signals or ultrasonic signals. Thus, the transmission scheme for radio signals is not limited to a radio PAN standard scheme, but may be a scheme such as a radio LAN standard or Bluetooth.

Figure 6:
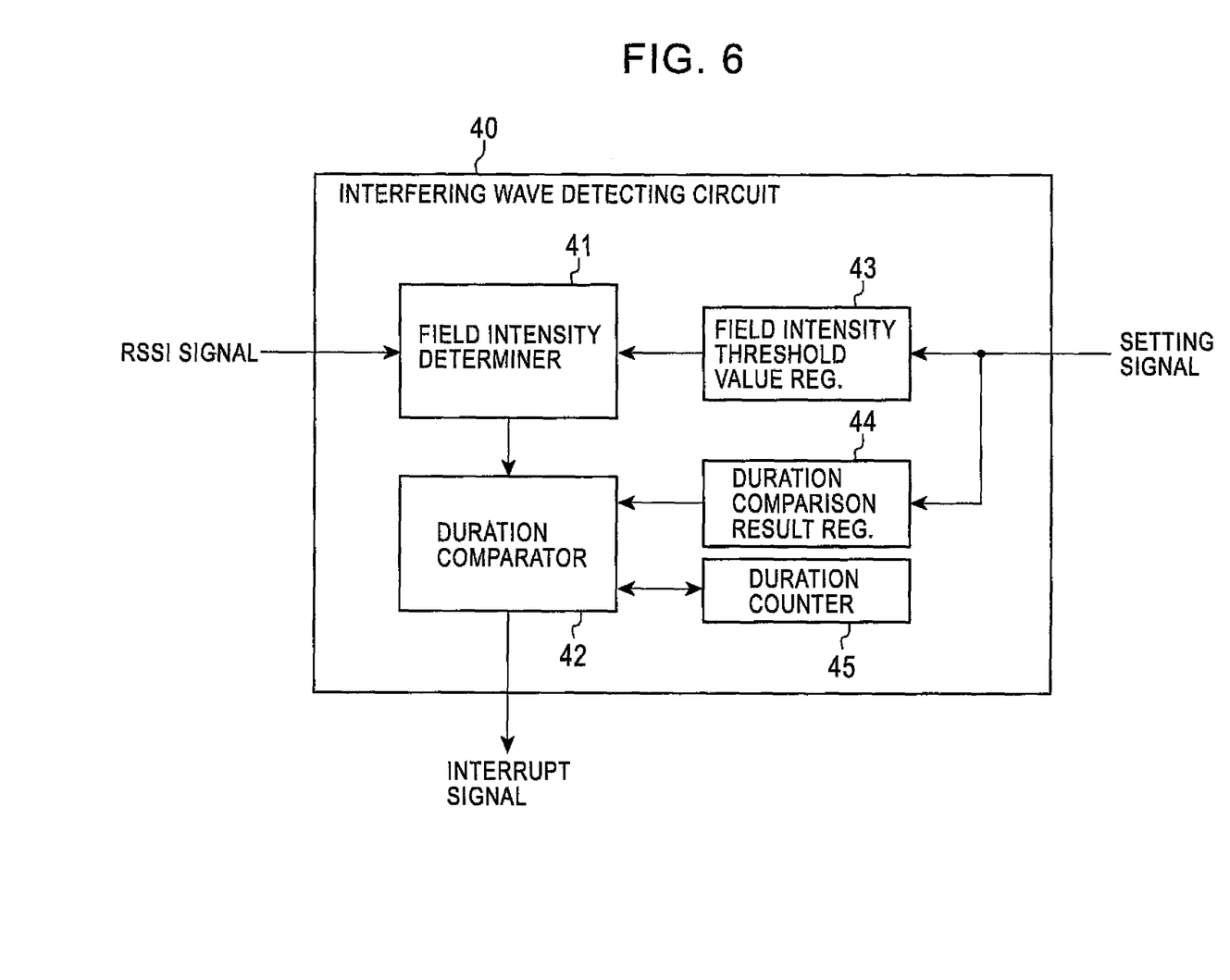
FIG. 6 is a block diagram showing the internal configuration of an interfering wave detecting circuit shown in FIG. 5.

FIG. 6 shows the internal configuration of the interfering wave detecting circuit 40 shown in FIG. 5. The interfering wave detecting circuit 40 has a field intensity determiner 41, a duration comparator 42, a field intensity threshold value register 43, a duration comparative value register 44, and a duration counter 45.

The field intensity determiner 41 is a determination circuit that determines whether the RSSI value is greater than a predetermined field intensity threshold value (indicating the sensitivity point). The duration comparator 42 is a circuit that compares the count of the duration counter 45 with a predetermined duration comparative value. If the duration of an interfering wave exceeds the duration comparative value, the comparator 42 generates an interrupt signal.

The field intensity threshold value register 43 is a register that a field intensity threshold value is set in. The field intensity threshold value is settable from the outside. The duration comparative value register 44 is a register that a duration comparative value is set in. The duration comparative value is settable from the outside. The duration counter 45 is a counter that performs time counting in response to a trigger from the field intensity determiner 41.

The field intensity threshold value and the duration comparative value can be set arbitrarily. The field intensity threshold value is preferably set according to the radio communication standard in use and the use environment. The duration comparative value is preferably set to a time corresponding to about twice a maximum packet length taking into account packets being accidentally out of synchronization. For example, if the maximum packet length is 34 bytes for TV radio remote controllers, the duration comparative value is set to the time corresponding to the transmission time for 68 bytes (34×2 bytes). As such, the duration comparative value can be set appropriately, i.e., an optimum duration comparative value for the adopted system can be set without being restricted to the maximum packet length specified in a recommendation of IEEE or the like. Hence, an interfering wave can be detected with a minimum wait time and the switching to another channel can be performed quickly. Thus wasteful wait time can be reduced to a minimum. It should be noted that the duration comparative value may be, in practice, decided by measuring (or counting) the number of information bits or symbols constituting a packet.

In the above-described embodiment, the interfering wave detecting circuit 40 is embodied (implemented) in the form of hardware, but the present invention is not limited in this regard. The interfering wave detecting circuit 40 may be implemented in the form of software that is executed by a usual central processing unit (CPU) or in the form of the combination of software and hardware.

Figure 7:
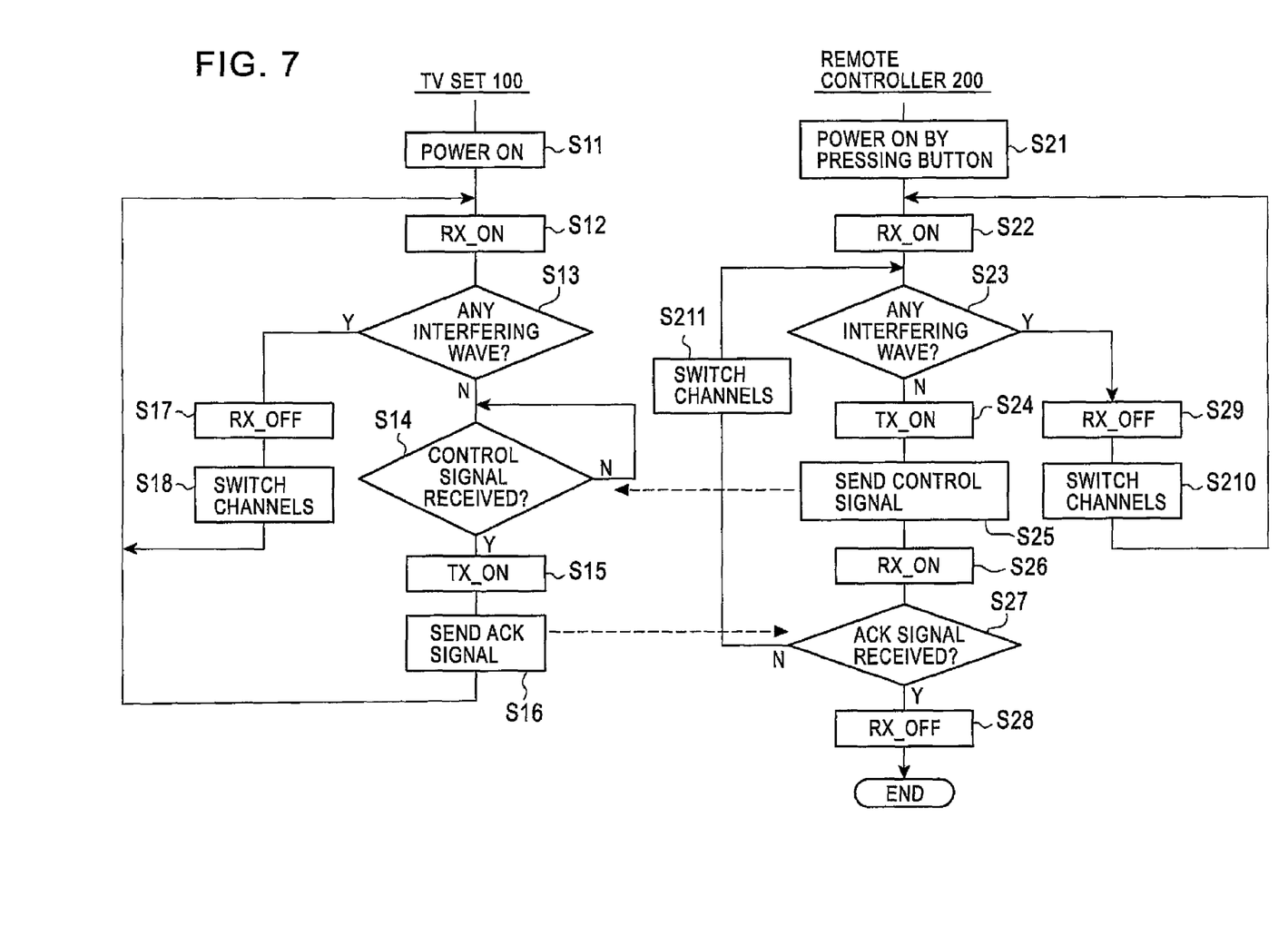
FIG. 7 is a sequence diagram showing the operation of the radio LSI device shown in FIG. 5.

FIG. 7 shows the operation of the radio LSI device 30, 30A. In this figure, the operation of the remote controller 200 is shown in the association with the operation of the TV set 100.

First, when the TV set 100 is powered on (step S11), it goes into a reception ON state (RX_ON) (step S12). Then, the TV set 100 determines the presence/absence of an interfering wave on the current transmit/receive channel (step S13). If an interfering wave is present, the TV set 100 goes into a reception OFF state (RX_OFF) (step S17) and switches to a different channel (step S18). If an interfering wave is determined to be absent on the current channel at step S13, the TV set 100 waits for an incoming control signal (step S14).

When the remote controller 200 is powered on in response to a button being pushed down (step S21), it goes into a reception ON state (RX_ON) (step S22). Then, the remote controller 200 determines the presence/absence of an interfering wave (step S23). If an interfering wave is present, the remote controller 200 goes into a reception OFF state (RX_OFF) (step S29) and switches to a different channel (step S210). If an interfering wave is determined to be absent at step S23, the remote controller 200 goes into a transmission ON state (TX_ON) (step S24) and transmits a control signal to the TV set 100 (step S25). Then, the remote controller 200 goes into the reception ON state (RX_ON) again (step S26).

The TV set 100 is in a state of waiting for an incoming control signal, i.e., the TV set 100 repeatedly determines the presence/absence of the incoming control signal (step S14). When a control signal arrives from the remote controller 200, the TV set 100 accepts the control signal and performs an operation (such as volume adjustment) according to the content of the control signal. The TV set 10 then enters a transmission ON state (TX_ON) (step S15) and transmits an Ack (acknowledgement) signal to the remote controller 200 (step S16).

The remote controller 200 is in a state of waiting for arrival of an Ack signal from the TV set 100, i.e., the remote controller 200 repeatedly determines the presence/absence of the incoming Ack signal (step S27). If an Ack signal is absent or has not arrived after a predetermined time of waiting, the remote controller 200 performs the channel switching (step S211) and determines the presence/absence of an interfering wave on the new channel (step S23).

Figure 8:
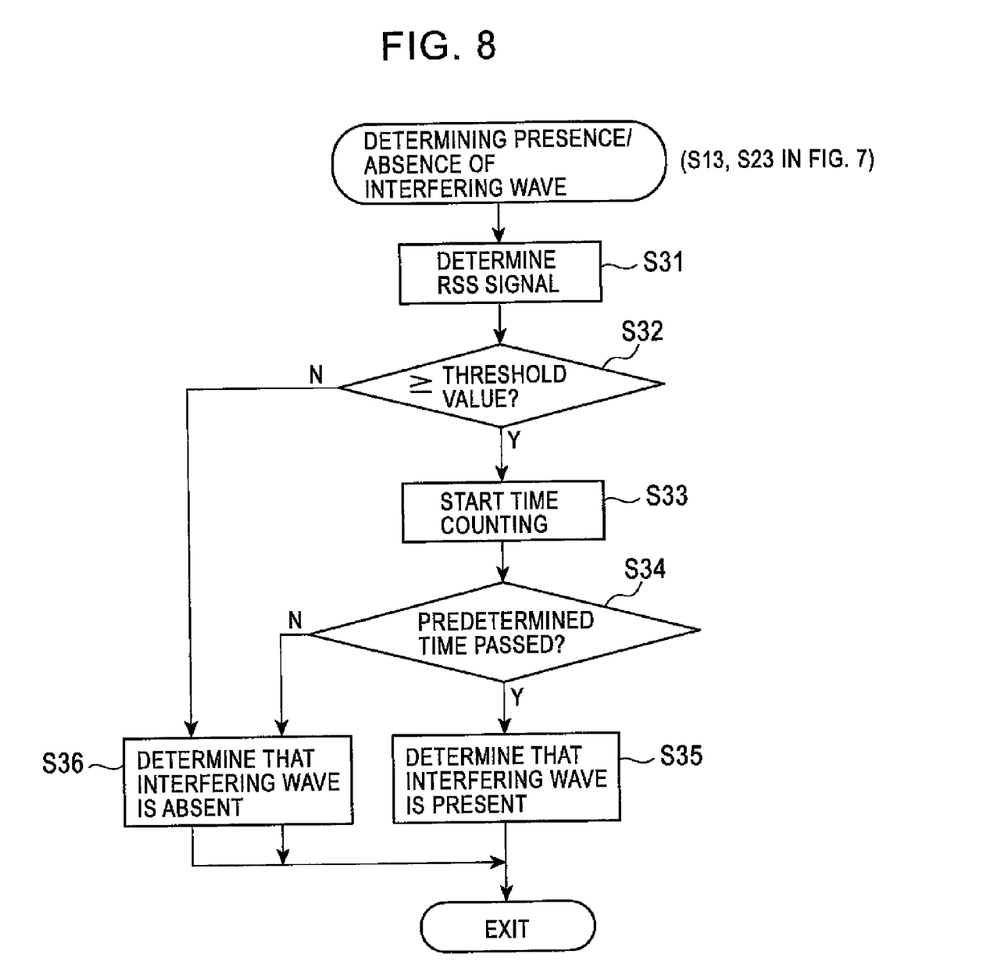
FIG. 8 is a flow chart showing the detail of the step for determining the presence/absence of an interfering wave shown in FIG. 7.

FIG. 8 shows in detail the operation of the step (S13 and S23) of determining the presence/absence of an interfering wave shown in FIG. 7. The step S13 of determining the presence/absence of an interfering wave is executed in the interfering wave detecting circuit 40 of the TV set 100. The step S23 of determining the presence/absence of an interfering wave is executed in the interfering wave detecting circuit 40 of the remote controller 200.

The interfering wave detecting circuit 40 receives an RSSI signal for the current transmit/receive channel and determines the value thereof (step S31). Then, the interfering wave detecting circuit 40 determines whether or not the radio wave strength value (RSSI) is no less than a predetermined threshold value (step S32). If the RSSI is less than the threshold value, the interfering wave detecting circuit 40 determines that an interfering wave is absent, and ends the process (step S36). On the other hand, if greater than or equal to the threshold value at step S32, the interfering wave detecting circuit 40 starts time counting (step S33).

The interfering wave detecting circuit 40 determines the duration of the interfering wave (step S34). Specifically, by comparing with a predetermined duration comparative value, the interfering wave detecting circuit 40 determines whether or not the interfering wave has lasted for over the predetermined duration. If the interfering wave has lasted for over the predetermined duration, the interfering wave detecting circuit 40 determines that an interfering wave is present and ends the process (step S35). If the interfering wave lasted for less than the predetermined duration, the interfering wave detecting circuit 40 determines that an interfering wave is absent and ends the process (step S36).

As understood from the above-described embodiment, the radio LSI device and the interfering wave detecting circuit according to the present invention continuously monitor changes in the RSSI when the RSSI becomes greater than a predetermined threshold value. Thus, if the RSSI goes below the predetermined threshold value in the predetermined time, the radio LSI device and the interfering wave detecting circuit can reliably determine that the radio channel is in a "state of being not subject to interference." As a result, unnecessary switching of the radio channels can be avoided and wasteful power consumption can be avoided. Further, by determining whether the RSSI is continuously greater than the predetermined threshold value for over the predetermined duration, the presence of an interfering wave on the channel concerned can be reliably determined. By avoiding use of such channel, communication can be performed avoiding the crowded channel.

Figure 9:
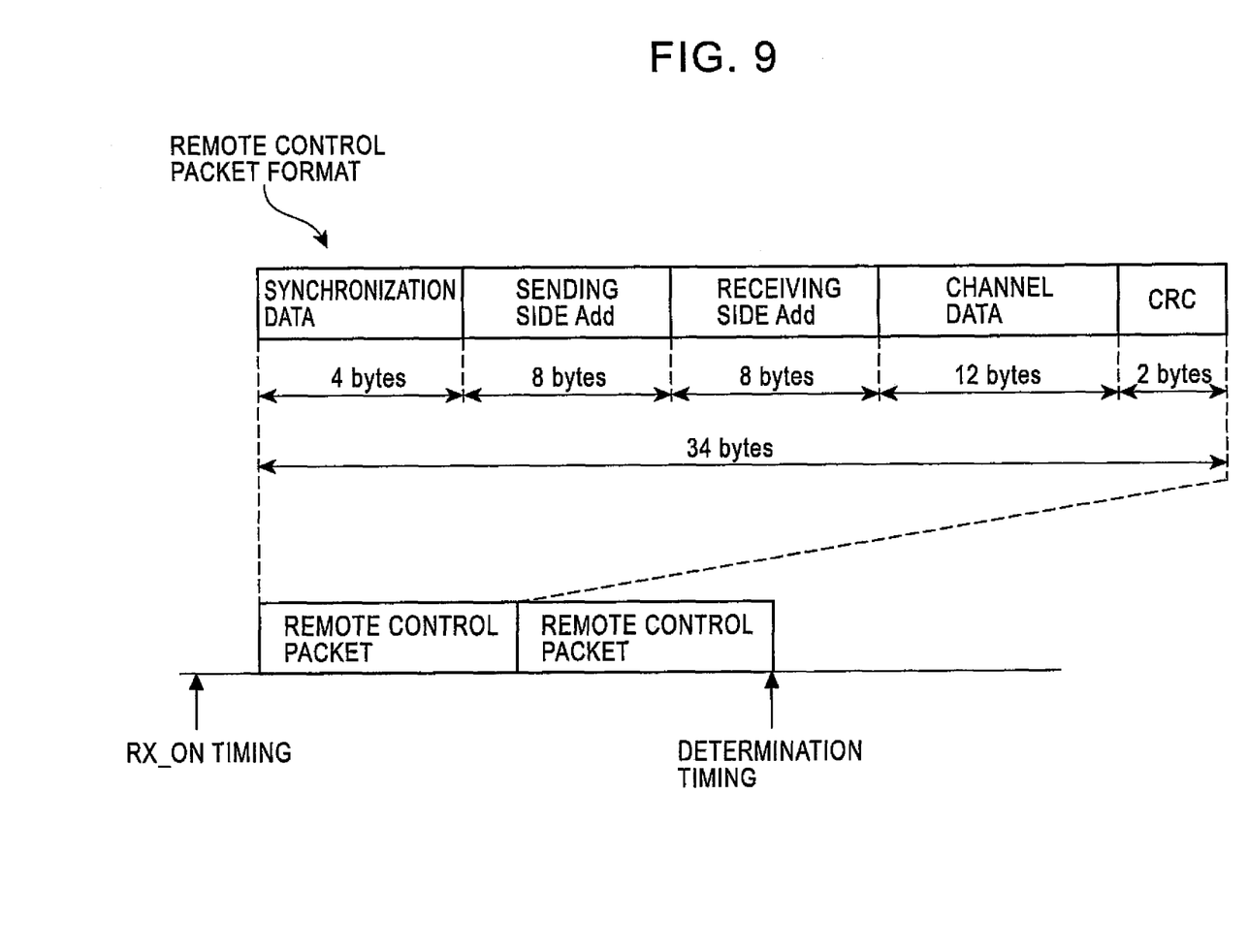
FIG. 9 diagrammatically depicts the format of the control signal.

FIG. 9 illustrates an exemplary format of the control signal (remote controller packet). The packet includes synchronization data (4 bytes), a sender's address (8 bytes), a recipient's address (8 bytes), channel data (12 bytes) and cyclic redundancy checking code CRC (2 bytes). The packet length is 34 bytes. The duration comparative value may be 64 bytes, which is twice the packet length. Thus, if the interfering wave continues over the predetermined time, which corresponds to the twice the packet length, from the RX_ON timing, then it is determined that this wave is really an adverse wave (really interfering wave).

Figure 2:
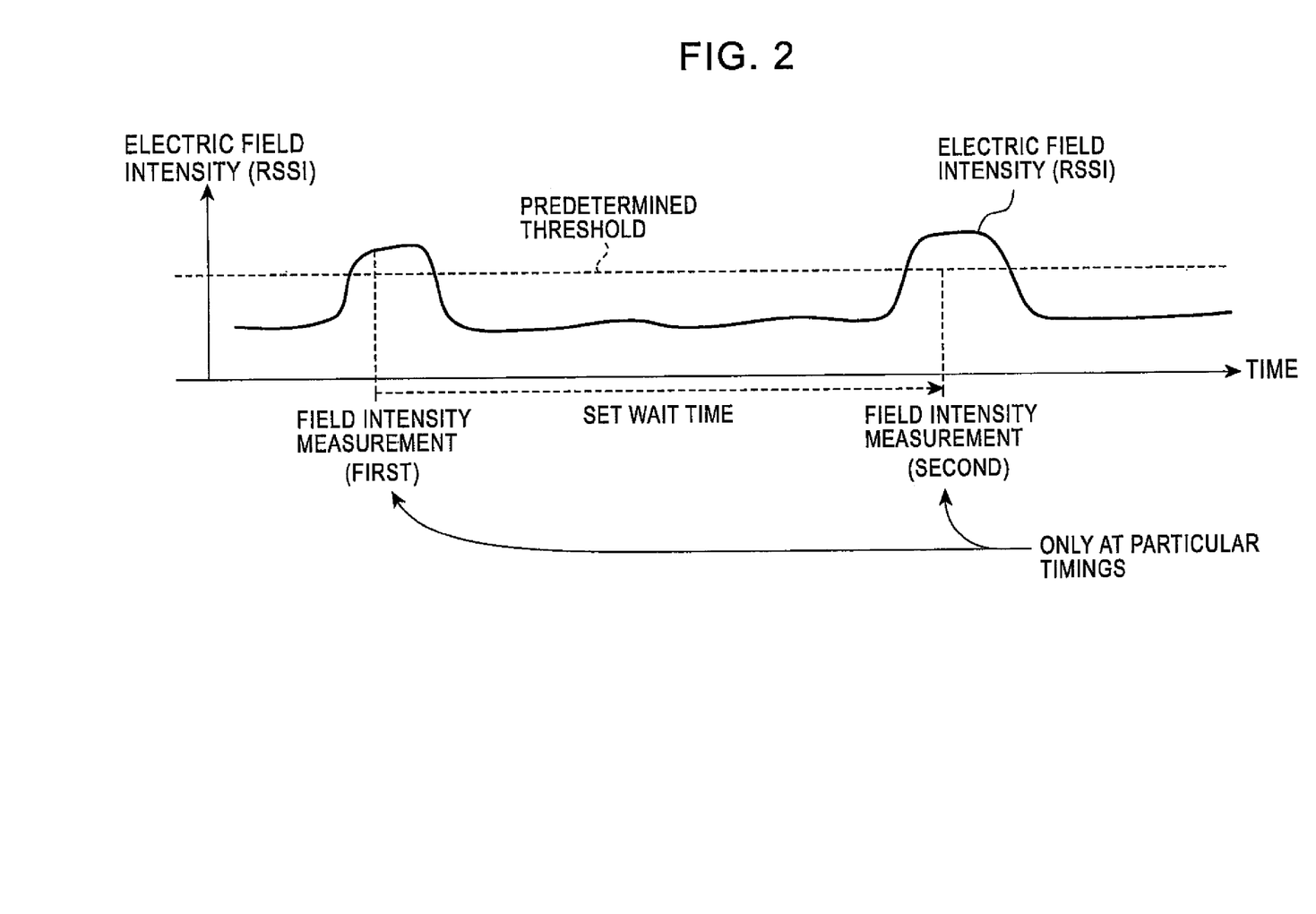
FIG. 2 is a timing chart showing a relationship between electric field intensity (RSSI) on the remote controller side and measurement timings in the situation shown in FIG. 1.
Figure 10A:
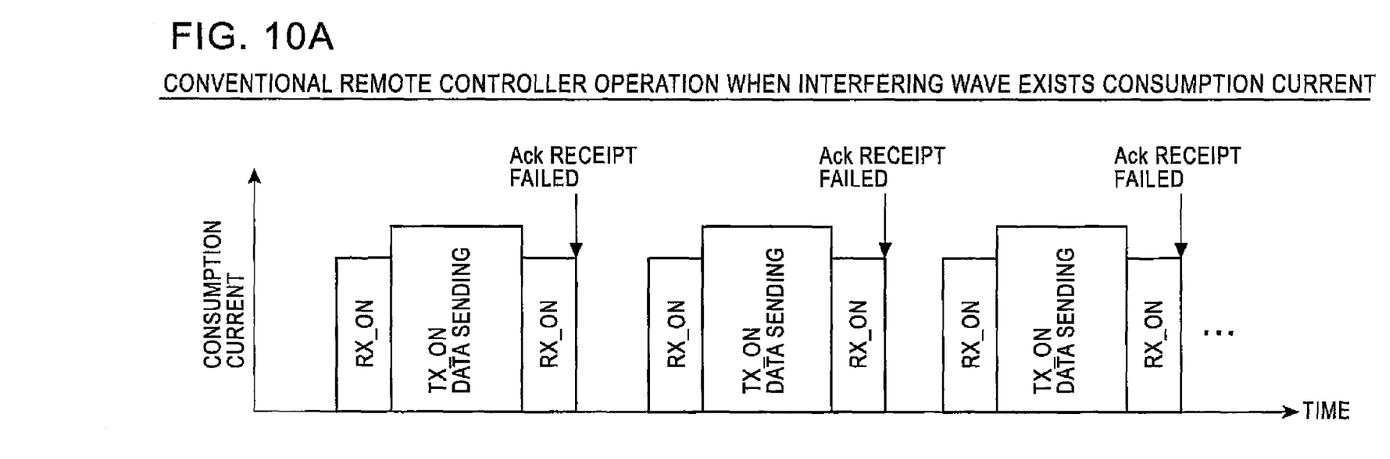
FIG. 10A is a time chart showing changes in consumption current in the prior art technology.
Figure 10B:
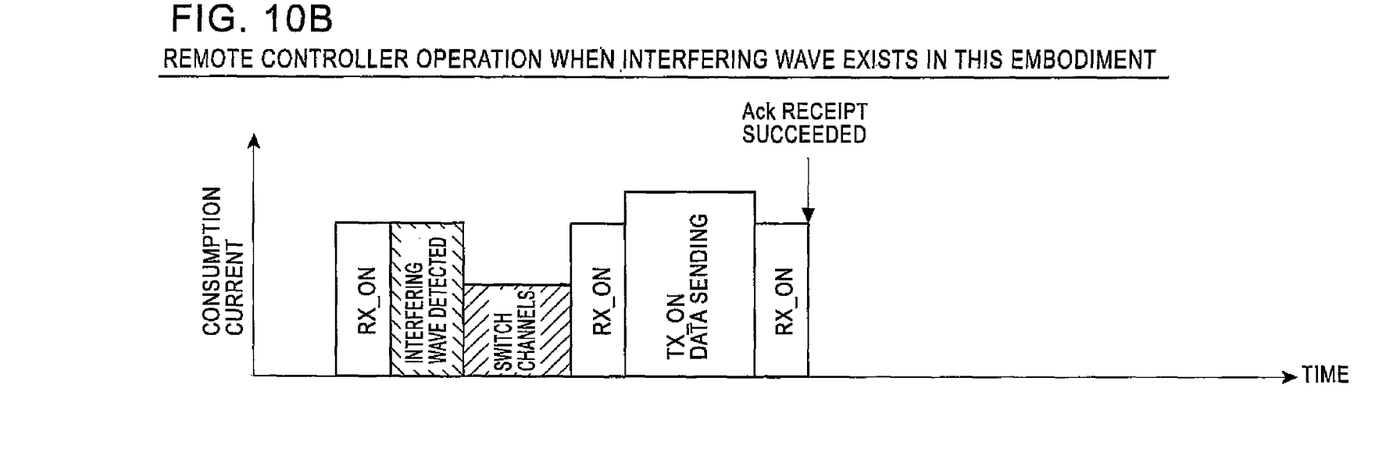
FIG. 10B is a time chart showing changes in consumption current in the embodiment of the present invention.

FIG. 10B illustrates the operation of the remote controller 200. This operation will be described with reference to FIG. 7 and FIG. 10C. After the remote controller 200 enters the RX_ON condition (step S22 in FIG. 7), it should be assumed that the remote controller 200 detects the interfering wave (YES at step S23). This interfering wave is the wave shown in the left half of FIG. 10C. In left half of FIG. 10C, the electric field intensity of the wave is continuously greater than the threshold value between the first measurement and second measurement so that the interfering wave detecting circuit 40 determines that there is an interfering wave. Then, the remote controller switches the channel to a different channel (step S210 in FIG. 7). The procedure returns to step S22 and the RX_ON condition is rebooted. If a wave of FIG. 2 is subsequently present (i.e., if the wave shown in the right half of FIG. 10C comes), the remote controller 200 (or the interfering wave detecting circuit 40) does not determine that this wave is the "interfering" wave because the electric field intensity of the wave is not continuously greater than the threshold value between the second measurement and third measurement. The electric field intensity of the wave is greater than the threshold value only at (or around) the second measurement and at (or around) the third measurement, and it is smaller than the threshold value between the second and third measurement. Thus, it is determined that there is no interfering wave. In other words, the interfering wave detecting circuit 40 ignores the wave of FIG. 2 and maintains the selected channel. Thus, the determination at step S23 becomes NO. The remote controller enters the TX_ON condition (step S24) and sends the control signal (step S25 or DATA SENDING in FIG. 10B). The remote controller 200 then enters the RX_ON condition (step S26) and receives the acknowledge signal (step S27). Therefore, the current consumption is small.

Figure 10C:
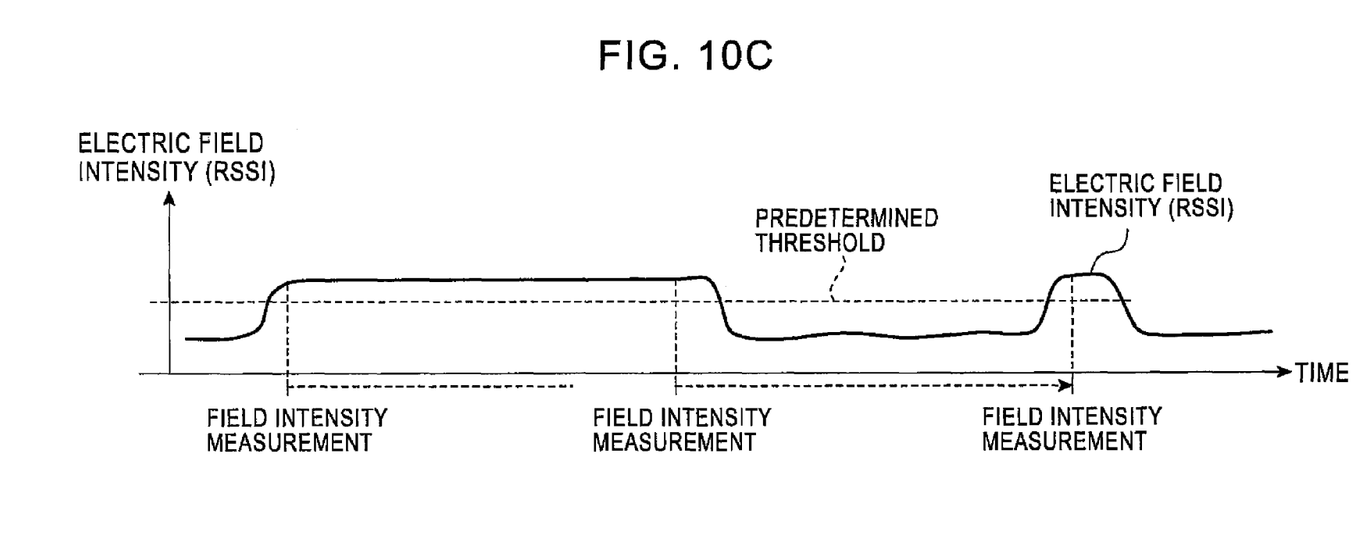
FIG. 10C is similar to FIG. 2 (right half wave is in FIG. 10C is the same as FIG. 2) and is useful to explain the operation of the remote controller of the invention in comparison with the prior art.

FIG. 10A shows the operation of a remote controller of the prior art. This operation will also be described with reference to FIG. 7 and FIG. 10C. The conventional remote controller does not have the step S23. After the remote controller enters the RX_ON condition (step S22), it enters the TX_ON condition (step S24). The remote controller sends the control signal (step S25 or DATA SENDING in FIG. 10A) and enters the RX_ON condition (step S26). If the wave shown in the left half of FIG. 10C is present, the conventional remote controller determines that this wave is an "interfering" wave because the electric field intensity at the first and second measurement is both greater than the threshold value. As a result, the remote controller does not receive the acknowledgement signal (NO at step S27). Accordingly, the selected channel is switched to another channel (step S211), and the remote controller enters the RX_ON condition again (step S22). The conventional remote controller also determines that there is an interfering wave when the wave of FIG. 2 (the wave in the right half of FIG. 10C) comes. The conventional remote controller determines that this wave is also "interfering" because the electric field intensity is greater than the threshold value at the second and third measurement. In the prior art, therefore, the failure to receive the acknowledgement signal is repeated if the wave of FIG. 2 is detected (FIG. 10A). Consequently, the current consumption in the prior art becomes greater than that in the present invention, as understood from the comparison of FIG. 10A with FIG. 10B.

In the above-described embodiment, the radio LSI devices 30, 30A according to the present invention are provided in the TV set 100 and the remote controller 200, but the present invention is not limited in this regard. The radio LSI device according to the present invention may be provided in a variety of communication apparatuses which is required to select one of a plurality of radio channels to perform radio communication in situations where an interfering wave is expected to be present.

Although the interfering wave detecting circuit 40 according to the present invention is provided in the large-scale semiconductor integrated circuit in the form of the radio LSI device, the present invention is not limited in this regard. The interfering wave detecting circuit 40 may be provided as part of a variety of communication apparatuses which is required to determine the presence/absence of an interfering wave according to changes in the electric field intensity of the interfering wave.

This application is based on Japanese Patent Application No. 2008-295438 filed on Nov. 19, 2008, and the entire disclosure thereof is incorporated herein by reference.

What is claimed is:

1. A radio LSI (large scale integration) device comprising:
an RF (radio frequency) transceiver unit having a plurality of radio channels;
an RF control unit for selecting one of said plurality of radio channels to set the selected channel as a current transmit/receive channel of said RF transceiver unit; and
an interfering wave detecting circuit for detecting an interfering wave, using an RSSI (received signal strength indication) signal of said current transmit/receive channel from said RF transceiver unit,
wherein said interfering wave detecting circuit includes
a field intensity determiner for determining presence of the interfering wave when a value of said RSSI signal is greater than a predetermined threshold value;
a duration counter that counts duration of the interfering wave after said field intensity determiner determines the presence of the interfering wave; and
a duration comparator that compares the duration of the interfering wave counted by said duration counter with a predetermined duration comparative value and, if said duration of the interfering wave exceeds said duration comparative value, generates an interrupt signal, and
wherein said RF control unit changes the setting of said current transmit/receive channel in response to said interrupt signal,
wherein said interfering wave detecting circuit further comprises a field intensity threshold value register for storing said threshold value such that said threshold value is externally settable, and a duration comparative value register for storing said duration comparative value such that said duration comparative value is externally settable, and
wherein said duration comparative value is a time corresponding to twice a packet length of a radio signal transmitted/received over said radio channel.

2. The radio LSI device according to claim 1, wherein the interfering wave detecting circuit is implemented in the form of hardware, software, or a combination of software and hardware.

3. The radio LSI device according to claim 1, wherein a power source for the interfering wave detecting circuit is a battery provided in the radio LSI device.

4. The radio LSI device according to claim 1, wherein the radio LSI device is provided in a television set or its remote controller.

5. An interfering wave detecting circuit which detects an interfering wave based on a value of an RSSI (received signal strength indication) signal, said interfering wave detecting circuit comprising:
a field intensity determiner that determines presence of the interfering wave when the value of said RSSI signal is greater than a predetermined threshold value;
a duration counter that counts the duration of an interfering wave whose RSSI value is determined to be greater than the predetermined threshold value;
a duration comparator that compares the duration of the interfering wave counted by said duration counter with a predetermined duration comparative value and, if said duration of the interfering wave exceeds said duration comparative value, generates an interrupt signal indicating intolerable continuity of said interfering wave; and
a field intensity threshold value register for storing said threshold value such that said threshold value is externally settable and a duration comparative value register for storing said duration comparative value such that said duration comparative value is externally settable,
wherein said duration comparative value is a time corresponding to about twice a packet length of a radio signal transmitted/received over said radio channel.

6. The interfering wave detecting circuit according to claim 5, wherein the interfering wave detecting circuit is implemented in the form of hardware, software, or combination of software and hardware.

7. The interfering wave detecting circuit according to claim 5, wherein a power source for the interfering wave detecting circuit is a battery provided in the interfering wave detecting circuit.

8. The interfering wave detecting circuit according to claim 5, wherein the interfering wave detecting circuit is provided in a television set or its remote controller.

9. A radio large-scale-integration device in signal communication with a remote device, said radio large-scale-integration device comprising:
a radio-frequency transceiver unit having a plurality of radio channels;
a radio-frequency control unit for selecting one of said plurality of radio channels to set the selected channel as a current transmit/receive channel of said radio-frequency transceiver unit for signal communication with the remote device, said radio-frequency transceiver being adapted to send a control signal to the remote device and wait for an acknowledge signal from the remote device; and
an interfering wave detecting circuit for detecting an interfering wave, using a received-signal-strength-indication signal of said current transmit/receive channel from said radio-frequency transceiver unit, if said radio-frequency transceiver does not receive the acknowledge signal from the remote device, wherein said interfering wave detecting circuit includes
a field intensity determiner for determining presence of the interfering wave when a value of said received-signal-strength-indication signal is greater than a predetermined threshold value;
a duration counter that counts duration of the interfering wave; and
a duration comparator that compares the duration of the interfering wave counted by said duration counter with a predetermined duration comparative value, and if said duration of the interfering wave exceeds said duration comparative value, generates an interrupt signal, and wherein said radio-frequency control unit changes the setting of said current transmit/receive channel in response to said interrupt signal, wherein said interfering wave detecting circuit further comprises a field intensity threshold value register for storing said threshold value such that said threshold value is externally settable, and a duration comparative value register for storing said duration comparative value such that said duration comparative value is externally settable, and wherein said duration comparative value is a time corresponding to twice a packet length of a radio signal transmitted/received over said radio channel.

10. The radio large-scale-integration device according to claim 9, wherein the interfering wave detecting circuit is implemented in the form of hardware, software, or a combination of software and hardware.

11. The radio large-scale-integration device according to claim 9, wherein a power source for the interfering wave detecting circuit is a battery provided in the radio large-scale-integration device.

12. The radio large-scale-integration device according to claim 9, wherein the remote device is a television set, and the radio large-scale-integration device is provided in a remote controller of the television set.

* * * * *